US008075020B2

(12) United States Patent
Colosimo et al.

(10) Patent No.: US 8,075,020 B2
(45) Date of Patent: Dec. 13, 2011

(54) PIPE FITTING FOR A HEATABLE PIPING OF A SCR SYSTEM

(75) Inventors: Franco Colosimo, San Mauro Torinese (IT); Mario Zasa, Nichelino (IT); Simone Cavanna, Cercenasco (IT)

(73) Assignee: Dayco Fluid Technologies, S.p.A., Turin (IT)

( * ) Notice: Subject to any disclaimer, the term of this patent is extended or adjusted under 35 U.S.C. 154(b) by 195 days.

(21) Appl. No.: 12/067,023

(22) PCT Filed: Sep. 16, 2005

(86) PCT No.: PCT/IT2005/000531
§ 371 (c)(1),
(2), (4) Date: Oct. 21, 2008

(87) PCT Pub. No.: WO2007/032034
PCT Pub. Date: Mar. 22, 2007

(65) Prior Publication Data
US 2009/0066077 A1 Mar. 12, 2009

(51) Int. Cl.
*F16L 53/00* (2006.01)
*F16L 11/12* (2006.01)
(52) U.S. Cl. ......... 285/41; 285/21.2; 285/119; 285/907; 174/47
(58) Field of Classification Search .................. 285/41, 285/119, 21.1, 21.2, 907; 174/47
See application file for complete search history.

(56) References Cited

U.S. PATENT DOCUMENTS

| 896,854 | A | * | 8/1908 | Parsons | 285/119 |
| 2,634,311 | A | * | 4/1953 | Darling | 285/119 |
| 2,883,513 | A | * | 4/1959 | Schnabel | 174/47 |
| 3,082,394 | A | | 3/1963 | Hahn et al. | |
| 3,900,047 | A | * | 8/1975 | Heppell | 285/41 |
| 4,472,621 | A | * | 9/1984 | Blackmore | 285/41 |
| 4,815,769 | A | * | 3/1989 | Hopperdietzel | 285/41 |
| 5,791,377 | A | * | 8/1998 | LaRochelle | |
| 6,402,205 | B1 | * | 6/2002 | Rose et al. | |
| 6,442,012 | B2 | * | 8/2002 | Koike et al. | |

FOREIGN PATENT DOCUMENTS

| DE | 4135082 | 12/1992 |
| EP | 0730115 | 9/1996 |
| EP | 1125810 | 8/2001 |

(Continued)

OTHER PUBLICATIONS

International Search Report prepared by the European Patent Office on Jun. 14, 2006 for International Application No. PCT/IT2005/000531.

(Continued)

*Primary Examiner* — James Hewitt
(74) *Attorney, Agent, or Firm* — Sheridan Ross, P.C.

(57) ABSTRACT

A pipe fitting for a heatable piping of a SCR ("Selective Catalytic Reduction") system presents a body defining a hydraulic connection to make flow an urea solution from/to such piping; the pipe fitting further presenting an electrical connection, which is provided with a first terminal connectable to an electrical power supply, and with a second terminal connectable to a heating element of the piping (9); the electrical connection being also provided with an electrical resistor embedded in the body of the pipe fitting, whose material is a polymeric base and is thermally conductive to heat up the urea solution when the electrical resistor is powered.

10 Claims, 1 Drawing Sheet

FOREIGN PATENT DOCUMENTS

GB    2056611    3/1981

OTHER PUBLICATIONS

ASTM Designation: E1461-07 Standard Test Method for Thermal Diffusivity by the Flash Method, ASTM International, Jan. 2008, 11 pages.

Redline of ASTM Designation: E1461-01 Standard Test Method for Thermal Diffusivity by the Flash Method, ASTM International, Jan. 2008, 18 pages.

ASTM E1461 Significance and Use, ASTM International, printed Aug. 24, 2011, http://www.astm.org/Standards/E1461.htm, 3 pages.

* cited by examiner

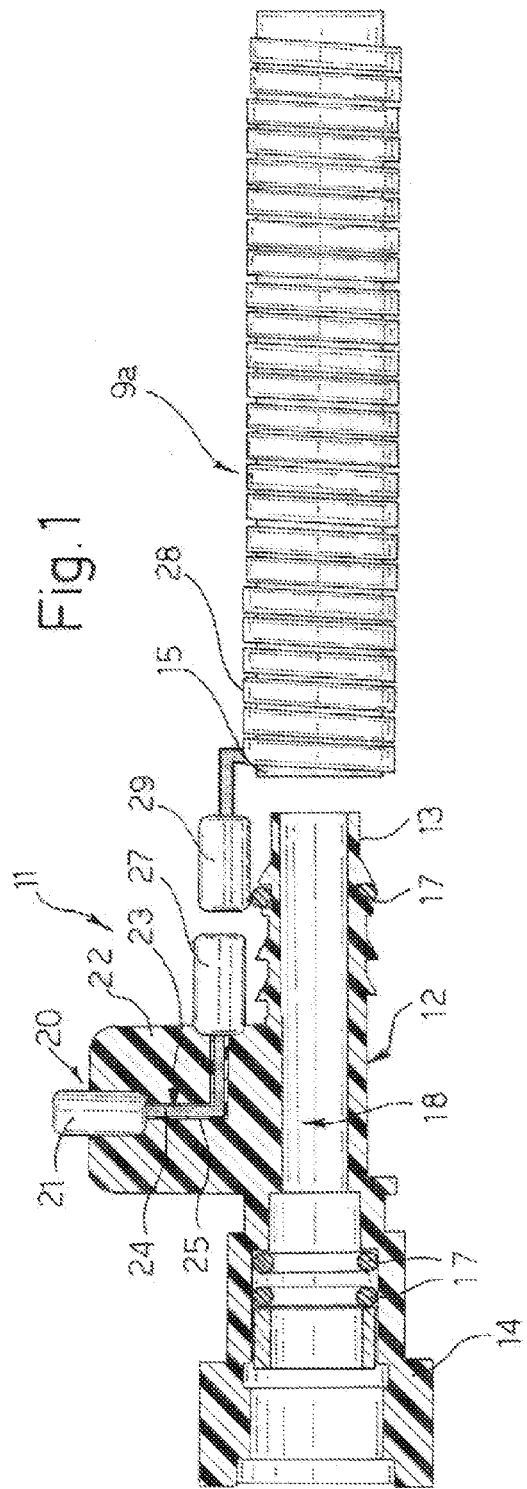
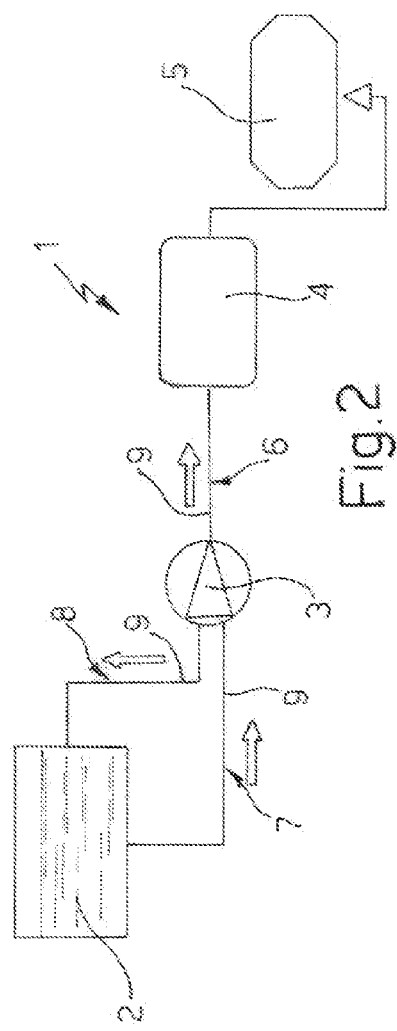

PIPE FITTING FOR A HEATABLE PIPING OF A SCR SYSTEM

CROSS REFERENCE TO RELATED APPLICATION

This application is a national stage application under 35 U.S.C. 371 of PCT Application No. PCT/IT2005/000531 having an international filing date of 16 Sep. 2005, which designated the United States, the entire disclosure of each of which is hereby incorporated herein by reference.

TECHNICAL FIELD

The present invention relates to a pipe fitting for a heatable piping of a SCR system.

BACKGROUND ART

To comply with the increasingly more restrictive standards aimed at curtailing atmospheric pollution caused by exhaust gases of motor vehicles, it is necessary to implement a purification system called SCR ("Selective Catalytic Reduction") in the exhaust system of the motor vehicles themselves, in particular of freight and passenger transportation vehicles, "duty trucks" and "heavy trucks".

The SCR system consists in injecting an aqueous solution of 32.5% of urea by compressed air at the catalyser inlet, located at the exhaust gas muffler: in the catalyser, the urea reacts with the nitrogen oxides contained in the exhaust gases, eliminating such oxides from the atmospheric emissions.

To accomplish this process it is necessary therefore to make available the urea solution in a tank, from where the solution itself can be taken to be injected into the catalyser, after having possibly been mixed with the compressed air, according to times and methods defined by an electronic control unit which accounts for various external (temperature, humidity, etc.) and internal (engine operation, number of revolutions, etc.) parameters.

It is necessary that the urea solution flows in the entire range of motor vehicles working temperatures, that is at temperatures from −40° C. to +80° C., and in all flow rate conditions (from 0 to 5.5 l/h).

However, the urea solution is serviceable only in liquid phase, and its freezing temperature is equal to approximately −11° C. Therefore, if the conveying means remains at temperatures under this value, the SCR system must be equipped with electrical heated pipings.

For this purpose, in general, the piping of SCR systems are provided with an external spirally wound electrical resistor. In use, while vehicles equipped with the SCR system are parked, the urea solution freezes at temperatures lower than −12° C.: when the engine is ignited after parking, the pipings containing the urea solution are immediately heated by passage of electrical current.

In practice, it is felt the need to reach a temperature of at least +5° C. for the urea solution in less than ten minutes after engine ignition, with the SCR system initially placed at an ambient temperature of −35° C.

The known solutions described above are not very satisfactory, because they cannot always achieve such a need and eliminate "plugs" of solid solution which are formed inside the hydraulic pipe fittings connecting the heated pipings to the other components of the SCR system.

Indeed, the heat generated by the electrical resistors spirally wound on the pipings cannot always sufficiently warm up the solidified part of solution inside the pipe fittings.

DISCLOSURE OF INVENTION

It is the object of the present invention to make a pipe fitting for a heatable piping of a SCR system, which allows to simply and cost-effectively solve the aforementioned problems.

According to the present invention it is made a pipe fitting for a heatable piping of a SCR system; the pipe fitting comprising a body made of a polymeric base material and defining a hydraulic connection for making an urea solution flow from/to said piping;
characterised in that said polymeric base material is thermally conductive, and in that it comprises electrical connection means carried by said body and comprising:
 a first terminal electrically connectable to an electrical power supply circuit,
 an electrical heating element embedded in said body and electrically connected to said first terminal, and
 a second terminal electrically connected to said first terminal, and electrically connectable to a further electrical heating element of said piping.

BRIEF DESCRIPTION OF THE DRAWINGS

The invention will now be described with reference to the accompanying drawings illustrating a non-limitative embodiment example, in which:

FIG. 1 shows, cross-sectionally and schematically, a preferred embodiment of a pipe fitting for a heatable piping of a SCR system according to the present invention; and FIG. 2 is a diagram of a SCR system.

BEST MODE FOR CARRYING OUT THE INVENTION

In FIG. 2, numeral 1 indicates a SCR system (schematically shown) of a motor vehicle, comprising a tank 2 containing a 35% solution of urea, a pump module 3, and a metering module 4, which possibly mixes the urea solution with compressed air to send it into a catalyser 5 (schematically shown) of the motor vehicle itself.

The pump module 3 is connected to the metering module 4 via a delivery line 6, and to the tank 2 via a suction line 7 and a recirculation line 8. The lines 6-8 comprise respective pipings 9, which are heatable by electrical current and connected to the other components in the system 1 via pipe fittings.

According to the present invention, at least part of the pipe fittings in the system 1 are also electrically heatable and define a connection which in addition to hydraulic, is electrical. One of said pipe fittings is shown in FIG. 1 and indicated by reference numeral 11. The pipe fitting 11 comprises a body 12, whose ends 13, 14 define respective pipe fittings or attachment portions adapted to be fluid tightly connected to a piping 9a (partially and schematically shown) and, respectively, to another component in the system 1 (not shown in FIG. 1). In particular, the end 13 defines a male coupling, of the known type and not described in detail, on which is fitted a corresponding female coupling forming part of an end 15 of the piping 9a, while the end 14 defines a female coupling, also of the known type and not described in detail, fluidtightly coupleable with a corresponding male coupling (not shown) of the system 1. The couplings 13, 14 are of the snap-on type and, to ensure fluidtightness, are provided with respective packing rings 17, specifically O-rings made of HNBR.

The body 12 defines a channel 18 which leads outwards through the couplings 13, 14, coaxially to the couplings 13, 14 themselves, and puts the piping 9a into communication with the remaining part of the system 1, to allow the passage of urea solution from/to the piping 9a itself. In particular, the channel 18 is straight, whereby the couplings 13, 14 are angularly distanced reciprocally by 180°, but evidently the couplings 13, 14 can be reciprocally offset by a different angle, for example an angle equal to 90°.

The material of the body 12 is a polymeric base and is made thermally conductive in such a way as to have a thermal conductivity, measured according to ASTM E1461 test standards, which is at least equal to 1.2 W/(K m), and preferably equal to 20 W/(k m). In such a way, the body 12 can rapidly transfer the heat in its entire volume to the channel 18.

The polymeric base of the body 12, in particular, is polyamide, preferably polyamide PA66 or PA12. Even more preferably, the polymeric base of the body 12 is polyamide PA12.

In particular, the polyamide of the body 12 is filled with glass fibres, preferably with a quantity equal to 30%, to increase its mechanical resistance.

The polyamide of the body 12 is made thermally conductive by integrating, in its mixture before forming of the body 12, electrical fillers, i.e. electrically conductive additives, for example metals or graphite.

The pipe fitting 11 further comprises an electrical connection or circuit 20 (schematically shown) carried by the body 12 and comprising a terminal 21, of the monopolar or bipolar type, electrically connectable to an electrical power supply circuit (not shown) forming part of the motor vehicle. The terminal 21 is carried by an intermediate portion 22 of the body 12 and radially faces outwards with respect to the channel 18, whereby it is distanced from the couplings 13, 14, in such a way as to be directly connected to a power socket, to an earthing socket, or to a socket connecting it in series to another electrical consumer, without interfering with the hydraulic coupling of the couplings 13, 14 themselves.

The connection 20 also comprises an electrical heating element 23, which is embedded in the body 12 in fixed position and is electrically connected to the terminal 21, whereby it heats up the portion 22 and the entire body 12, by thermal conduction, and, consequently, the urea solution contained in the channel 18, when the element 23 is electrically supplied. In particular, the element 23 is embedded in the body 12 during a co-moulding operation of the polymeric base material on the element 23 itself.

The element 23 comprises a core 24 defining an electrical resistor, and a sheath 25 which surrounds the core 24 to electrically insulate it from the polymeric base material of the body 12.

In particular, the core is made of a high conductive power metallic material. Preferably, the core 24 is made of NiCr8020, because this material is stable at high temperatures.

The sheath 25, instead, is made of an electrically insulating polymeric material, suitable for both transmitting heat and protecting from possible contact with the core 24. In particular, the sheath 25 is made of polyamide, for example polyamide PA12 or PA66. Preferably, the sheath 25 is made of polyamide PA12.

The connection 20 further comprises a terminal 27 electrically connected to the terminal 21 to transmit the electrical power supply, in series or in parallel to the resistance of the element 23, to the piping 9a. In particular, the terminal 27 is associated to the coupling 13 to be electrically connected, without intermediate wiring, to an electrical heating element carried by the piping 9a, in particular to an electrical resistor 28 helically wound on the piping 9a itself. As shown in FIG. 1, the terminal 27 is arranged on a side of the portion 22, that is on the outside and by the side of the coupling 13, while the resistor 28 is provided with its own terminal 29 (schematically shown) arranged outside the piping 9a, in radial position corresponding to that of the terminal 27 with respect to the axis of the channel 18 and of the piping 9a.

In particular, the terminals 27 and 29 are carried by the body 12 and, respectively, by the end 15 in fixed positions so to allow an automatic coupling between the terminals 27, 29 themselves when the end 15 is snappingly fitted onto the coupling 13.

The terminals 21, 27 are defined, for example, by respective seats for male terminals. Alternatively, these may be defined by "fastom" type connectors or "plugs", according to the needs present in the motor vehicle and in the system 1.

In use, the element 23 arranged inside the body 12, when electrically powered, develops heat which is transmitted by conduction from the material of the body 12 to defrost the solidified parts of the urea solution in the channel 18.

Therefore, the combination of the features relative to the thermal conductivity of the material of the body 12 and of the features relative to the position of the element 23 in the body 12 allow to simply eliminate the presence of "plugs" of solid material in the channel 18. At the same time, the connection 20, as a whole, allows to electrically supply both the resistors 24, 28 by means of a single input terminal, i.e. the terminal 21.

The element 23 further allows to achieve the object of defrosting the urea solution contained in the system 1 in the intervals of time imposed by car manufacturers, and to uniformly distribute the developed thermal power along the lines 6-8 of the system 1, avoiding concentrations of heat at the pipings 9. As a consequence, the uniform distribution along the lines 6-8 also leads to a lower waste of global energy.

The pipe fitting 11 is however simple to make, light, relatively cheap and makes relatively simple the hydraulic and electrical coupling of the pipings 9 to the other components in the system 1 and, therefore, the assembly of the system 1 itself in the motor vehicle.

Finally, from the above, it is apparent that changes and variations can be applied to the pipe fitting 11 described with reference to the accompanying figures without departing from the scope of protection of the present invention.

In particular, the length, position, geometry of the element 23, and the shape and geometry of the body 12 are designed with respect to the thermal power which is required on a case-by-case basis by the specific use and relative to the dimensions and collocation of the components of the system 1. In particular, a section of the element 23 may be arranged adjacent to a zone of the channel 18 or in such a position to be partially touched by the urea solution in the channel 18.

Finally, the pipe fitting 11 may be used to reciprocally connect two heatable pipings in the system 1, not only hydraulically but also electrically if the terminal 21 were associated to the coupling 14 in a similar way as that set forth above for the coupling 13 and the terminal 27.

What is claimed is:

1. In a selective catalytic reduction system including a heatable piping and a pipe fitting, comprising: a body made of a polymeric base material and defining a hydraulic connection to make a urea solution flow from/to said piping; wherein said polymeric base material comprises electrical fillers added before forming so as to make the body thermally conductive, and comprises electrical connection means carried by said body including: a first terminal electrically connected to an electrical power supply circuit, an electrical heating element embedded in said body and electrically connected to said first terminal, and a second terminal electrically connected to said first terminal, and electrically connectable to a further electrical heating element of said piping; and wherein said polymeric base material is polyamide PA12, and said electrical heating element is comoulded in the pipe fitting; and said electrical heating element comprises a core defining an electrical resistor, and
an electrical insulation sheath between said core and said polymeric base material.

2. A pipe fitting according to claim 1, characterised in that said body comprises two couplings adapted to be fluid tightly coupled to said piping and, respectively, to another component of said SCR system, and in that said first and second terminals are arranged externally to said couplings.

3. A pipe fitting according to claim 2, characterised in that said first terminal is distanced from said couplings so as not to interfere with the hydraulic coupling of said couplings.

4. A pipe fitting according to claim 2, characterised in that said first and second terminals are defined by respective seats for male terminals.

5. A pipe fitting according to claim 1, characterised in that the thermal conductivity of said polymeric base material, is measured according to ASTM E1461 test standards, and is at least equal to 1.2 W/(K m).

6. A pipe fitting according to claim 5, characterised in that the thermal conductivity of said polymeric base material, measured according to ASTM E1461 test standards, is equal to 20 W/(K m).

7. A pipe fitting according to claim 1, characterised in that said polyamide is filled with glass fibres.

8. A pipe fitting according to claim 7, characterised in that said glass fibres are in quantity of 30%.

9. A pipe fitting according to claim 1, characterised in that said sheath is made of polyamide PA12.

10. A pipe fitting according to claim 1, characterised in that said core is made of NiCr8020.

* * * * *